US006062289A

United States Patent [19]

Cunningham et al.

[11] Patent Number: 6,062,289

[45] Date of Patent: May 16, 2000

[54] LAMINATED CLAMP FOR RIM HOLDING TIRE CHANGERS

[75] Inventors: Charles L. Cunningham, Nashville; David M. Carpenter, Brentwood, both of Tenn.

[73] Assignee: Hennessy Industries, Inc., La Vergne, Tenn.

[21] Appl. No.: 09/046,908

[22] Filed: Mar. 24, 1998

[51] Int. Cl.[7] .......... B60B 30/06

[52] U.S. Cl. .......... 157/16; 157/14; 157/21

[58] Field of Search .......... 157/16, 21, 14

[56] References Cited

U.S. PATENT DOCUMENTS

| | | | |
|---|---|---|---|
| 4,750,538 | 6/1988 | Du Quesne | 157/1.24 |
| 5,050,659 | 9/1991 | Scalambra | 157/1.24 |
| 5,219,012 | 6/1993 | Corghi | 157/19 |

*Primary Examiner*—David A. Scherbel
*Assistant Examiner*—Willie Berry, Jr.
*Attorney, Agent, or Firm*—Waddey & Patterson; I. C. Waddey, Jr.

[57] ABSTRACT

A laminated clamp for use in connection with rim holding tire changers. The clamp includes a plurality of pliable gripping plates alternately disposed between a plurality of rigid support plates. The plurality of gripping plates provide multiple surfaces for effectively gripping the rim of a wheel and the support plates provide a rigid support structure for the clamp. The gripping plates are constructed of a material that is capable of gripping the rim without causing damage thereto. The gripping plates and support plates are configured to form claws for gripping the wheel rim from either the outside or the inside the rim. To prevent damage to the wheel, the edges of the gripping plates extend peripherally beyond the edges of the support plates thereby preventing the support plates from contacting the rim when the rim is operably seated in the clamp. Two of the support plates include base portions configured for attachment to the clamp carrier of the tire changer.

18 Claims, 4 Drawing Sheets

10 34 20 32 36 12 18 16 22 24 26 22 23 23 16

LAMINATED CLAMP FOR RIM HOLDING TIRE CHANGERS

BACKGROUND OF THE INVENTION

The present invention relates generally to rim holding tire changers, and more particularly to the clamps used to hold a wheel in a fixed relation to the table of a rim holding tire changer while a tire is mounted on or removed from the rim.

One rim holding tire changer can be used to mount or dismount the tires for a variety of types of vehicles. It is not uncommon for such a changer to be used to mount and dismount the tires on the rims of automobiles, pick-up trucks, motorcycles, and the like. Further, with some automobile rims, the rims are quite decorative, made of polished chrome and the like and thus require a special clamp in order to avoid marring the surface of the rim.

It will be appreciated by those skilled in the art of designing and manufacturing equipment used to change the tubeless tires mounted on the rims of cars, light trucks and other vehicles, that such equipment must perform quickly and efficiently in order to be competitive in the marketplace. Modest improvements in the industry can thus become significant.

In the normal tire-changing procedure, the operator places a rim on the table of the rim holding tire changer, secures the rim to the table, places a tire over the rim, mounts the tire on the rim by using the mount/dismount head to guide the bead over the rim, and then fills the air chamber of the tire with air to inflate the tire. This procedure is described in detail in U.S. patent application Ser. No. 08/516,129, the substance of which is incorporated here and by reference, and which is assigned to the Assignee of the present invention.

For several years, automatic type tire changers have been in use for the repair and replacement of tires. There have been two basic types of changers in use over the past 15 or 20 years. One type makes use of the center hole of a wheel to secure the wheel during dismounting and mounting of a tire. A tire changer of this type utilizes a threaded shaft and threaded cone device to maintain the position of the wheel during the tire changing process.

A second type of tire changer is known as a rim holding tire changer and is the type of equipment for which Applicant's invention is designed. It utilizes claws to grip the rim of the wheel to stabilize the wheel and maintain the wheel in position on the changer. Examples of the type of equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. Other manufacturers of such equipment include FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to Applicant as co-inventor in Design U.S. Pat. No. 293,916.

A machine of this type generally has a tire changing table surface on which the wheel rests while the tire is mounted or dismounted. The clamp is used to secure the wheel to the table top of the tire changer while the tire is mounted or dismounted. It is critical that the wheel be securely mounted during this process as it requires a considerable amount of force to mount and dismount a tire from the wheel rim. If the wheel is not securely held in place, the person operating the machine and any bystanders could be injured by a wheel jumping off the tire changer. While it is important that the wheel be securely positioned, it is also important to the consumer that this be accomplished in a manner that does not damage the rim.

A clamp for use in such an apparatus is generally constructed from steel or a similar hard metal and formed so that it can be used in two ways, either by clamping the outer periphery of the rim of the wheel or by clamping the wheel from inside the rim. When a wheel is clamped on the outside, there is often some amount of rotational slippage during the procedure which tends to cause damage to the rim and mar its appearance. Clamping the wheel from the inside also has as a drawback potential damage to the wheel rim. Because of the smooth surface of the inside of the wheel rim, a clamp must have a sharp point or serration to grip the wheel sufficiently. This further damages the appearance of the wheel rim.

In an effort to prevent damage to the wheel, manufacturers of tire changers have attempted to design clamps having claws that can provide stability without marring the wheel. One solution for use in situations where the wheel is clamped from the outside of the wheel has been to cover the claw or gripping portion of the clamp with a plastic material. Such a protective covering does prevent the hard surface of the claw from gouging into the wheel, but it does not eliminate damage resulting from rotational slippage.

To prevent damage when clamping the inside of a wheel, manufacturers have commonly provided rubber blocks that are compressed between the claw and the inside of the wheel. However, the rubber blocks cannot effectively secure a rim unless the wheel is clean and free of dirt. If the wheel is not clean, it can slip and jump off the rubber blocks in a dangerous manner.

Another option has been to put nylon booties over the clamp to protect the wheel rim surface. While this does reduce the damage to the wheel, it does not eliminate all damage to the rim surface from the grip of the claw.

What is needed, then, is a clamp having claws configured to maintain a wheel in place on a tire changing apparatus in a manner that is safe for the machine's operator and will not damage the wheel rim or allow the wheel to slip or jump off the machine. Furthermore, such a clamp should be capable of being used as a fixed clamp or an adjustable clamp, to grip the wheel rim from either the inside or the outside and should allow for inexpensive components that can be field repaired by the user.

SUMMARY OF THE INVENTION

The present invention relates generally to rim holding tire changers, and more particularly to a laminated clamp that can be connected to the table top of the tire changer to secure a wheel in place while a tire is mounted or dismounted without damaging the wheel rim. This is accomplished by the use of a softer material sandwiched between a stronger, more rigid material that allows a rim to be gripped by the softer material, which is supported by the more rigid material. This invention allows a tire to be changed safely without damaging rim of the wheel.

The clamp of the present invention comprises a plurality of gripping plates alternately interposed between a plurality of support plates. The gripping plates are configured to directly engage the rim of the wheel, whereas the support plates provide a supporting structure for the clamp. In the preferred embodiment, each of the gripping plates is constructed from an elastomeric material, such as rubber or plastic, and the support plates are constructed of metal. At least one of the support plates includes a base configured to enable attachment of the clamp to the clamp carrier of the tire changer. Each of the gripping plates includes a first edge configured to grip an outside surface of the wheel and a second edge configured to grip an inside surface of the wheel. The edges of the gripping plates extend peripherally beyond the adjacent support plates to prevent the support plates from directly engaging the wheel when the gripping plates are compressed by the rim. These gripping edges include notched portions which form claws for engaging the wheel rim. Accordingly, when the wheel is operably positioned on the clamp, the edge of the rim is seated against the notched portions to retain the rim in place.

In the preferred embodiment, the clamp of the present invention comprises at least four gripping plates alternately disposed between a plurality of support plates. The support plates include a pair of end plates, a pair of mounting plates each having a base configured for attachment to the clamp carrier of the tire changer, and an intermediate support plate. In the preferred embodiment, the gripping plates and support plates are arranged as follows to form a laminated clamp: end plate, gripping plate, mounting plate, gripping plate, intermediate plate, gripping plate, mounting plate, gripping plate, and end plate. Each of the gripping plates includes a first edge configured to grip an outside surface of the wheel rim and a second edge configured to grip an inside surface of the wheel rim. The edges extend peripherally beyond adjacent support plates so as to prevent contact of the rim with the support plates when the gripping plates are compressed by the rim.

The present invention may further be described as a method of clamping a wheel rim on a rim holding tire changer, comprising the steps of providing a gripping apparatus which includes a plurality of gripping plates interpositioned between a plurality of support plates, the gripping plates each having gripping edges configured to grip the rim of a wheel rim, and causing the gripping plates to engage the wheel rim so that the gripping edges are held firmly against the rim and the support plates are prevented from contacting the rim.

DESCRIPTION OF THE PREFERRED EMBODIMENTS

Figure 2:
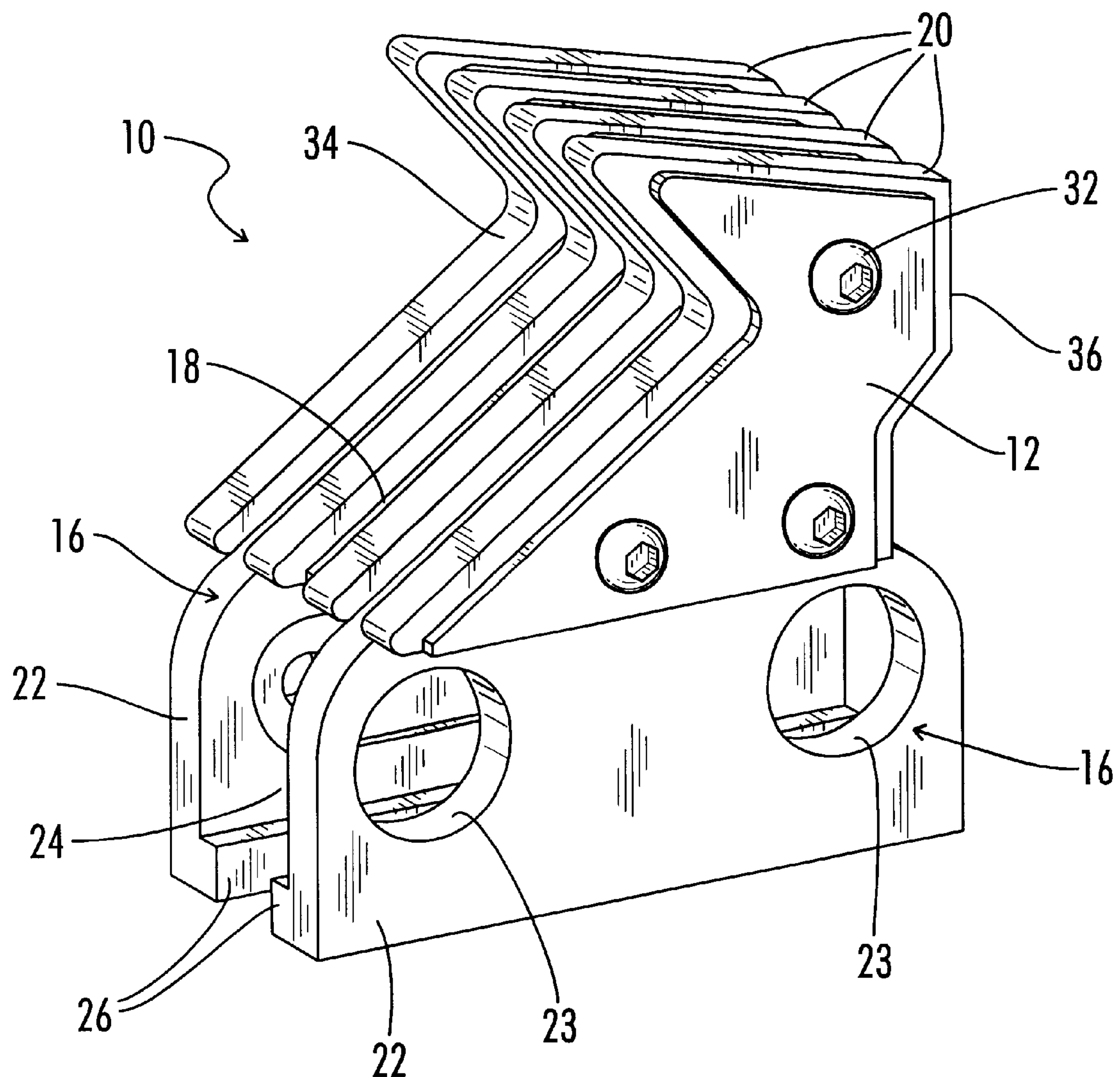
FIG. 2 is a perspective view of the present invention.
Figure 3:
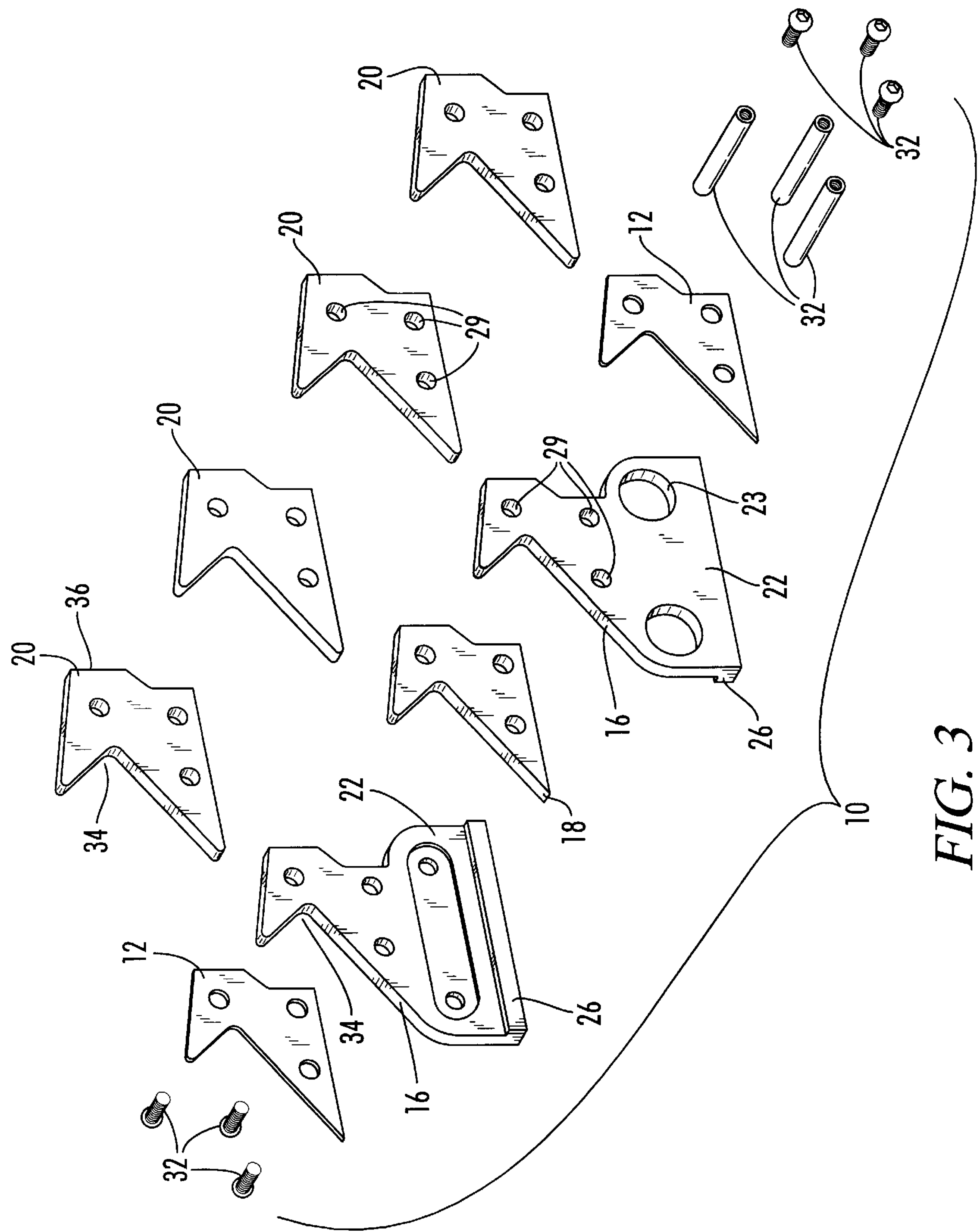
FIG. 3 is an exploded view of the present invention.

Applicant's invention will be best understood when considered in light of the following description of the preferred embodiment of the invention, as illustrated in FIGS. 2 and 3 of the attached drawings wherein like reference numerals refer to like parts.

Figure 1:
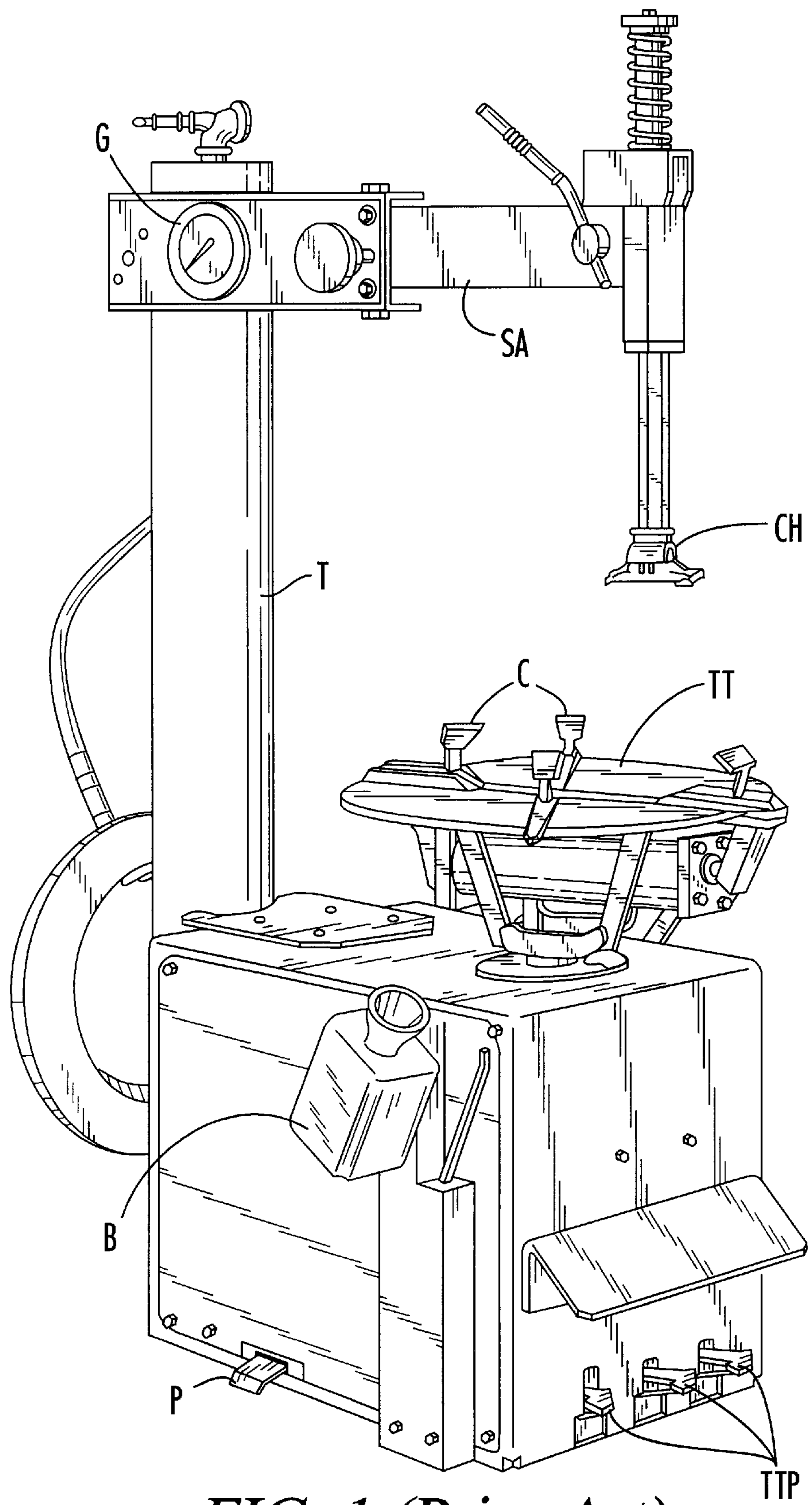
FIG. 1 is a perspective view of a rim holding tire changer.

With reference to FIG. 1, a typical rim holding tire changer includes a tower T, an air gauge G, an inflation pedal P, a table top TT, clamps C, a lube bottle B, a combination mount/dismount head CH, a swing arm SA and table top pedals TTP.

The laminated clamp of the present invention is designated generally by the reference numeral 10 in FIG. 2. The clamp 10 comprises gripping plates 20 interposed between support plates 12, 16 and 18. Each gripping plate 20 is interpositioned between two adjacent support plates 12, 16 or 18 to form a laminated configuration. The support plates 12, 16 and 18 provide a support structure for the clamp 10 and means for attaching the clamp 10 to the clamp carrier 21 of a rim holding tire changer. In the preferred embodiment, the support plates 12, 16 and 18 are constructed of a rigid material, such as metal, which will provide the necessary support to the flexible gripping plates 20.

The gripping plates 20 are constructed from a material that is pliable enough to engage the rim of a wheel without causing damage and yet strong enough to withstand the force exerted on it during the tire changing procedure. Accordingly, the gripping plates 20 are preferably constructed from a non-abrasive, elastomeric material, such as rubber, urethane and the like, which is suitably rigid and capable of gripping the rim. The gripping plates 20 are configured so that the edge of each plate 20 extends peripherally beyond the edges of the support plates 12, 16 and 18. It is these gripping edges that engage the wheel rim and secure the wheel in place while a tire is mounted or dismounted.

With reference to FIG. 3, an exploded view of the clamp 10 of the present invention is shown illustrating the preferred configuration and alignment of the support plates 12, 16 and 18 and the gripping plates 20. In the preferred embodiment, the clamp 10 comprises four gripping plates 20 of the same size and shape interposed between support plates 12, 16 and 18. Unlike a clamp having a claw formed of one continuous surface, the plurality of gripping plates 20 of the clamp 10 of the present invention provide a plurality of gripping surfaces for gripping the wheel rim.

Figure 4:
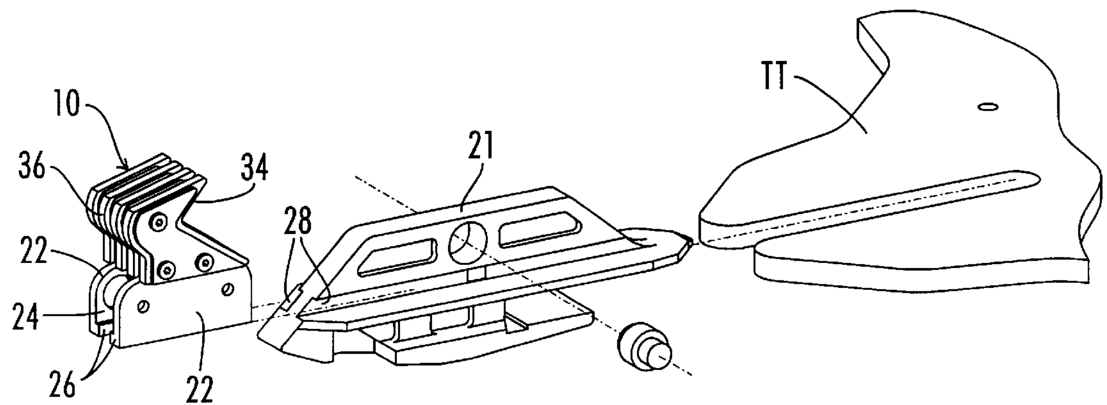
FIG. 4 is an exploded view of the present invention, a clamp carrier and a rim holding tire changing table.
Figure 5:
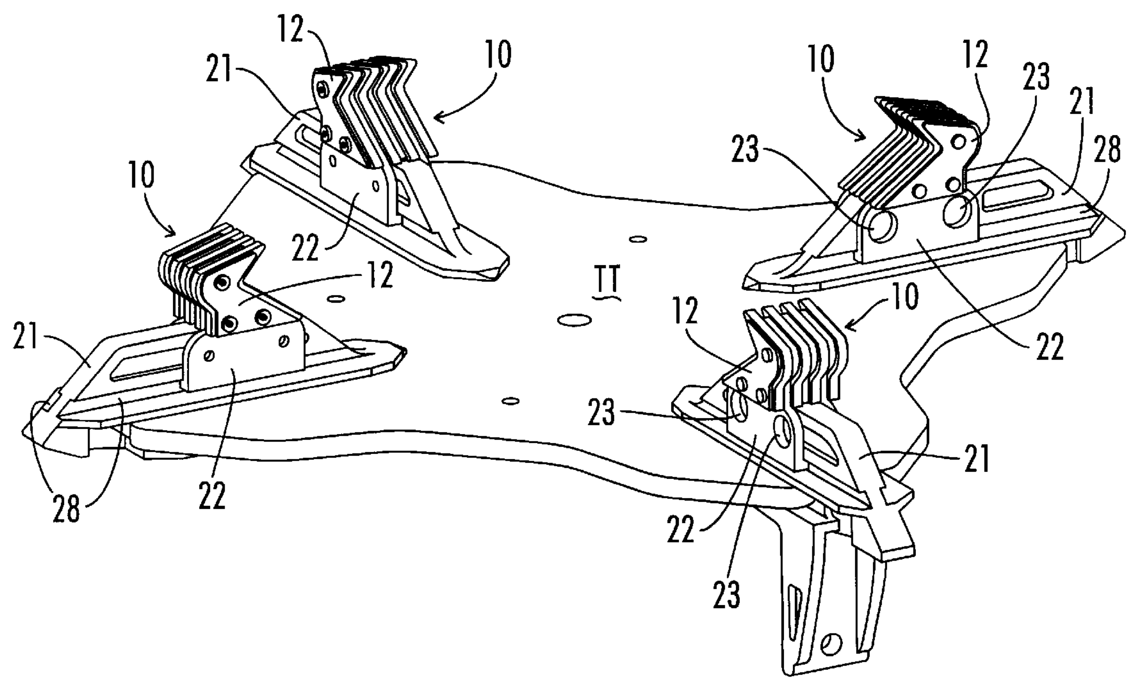
FIG. 5 is a perspective view of the table of a rim holding tire changer showing the clamp carriers and the present invention attached.

The support plates 12, 16 and 18 of the clamp 10 of the present invention include end plates 12, mounting plates 16 and an intermediate support plate 18. The end plates 12 are positioned on the outer ends of the clamp 10. Intermediate plate 18 is interpositioned between the two innermost gripping plates 20, and serves as a spacer to enable proper alignment of the mounting plates 16, as discussed hereinbelow. The mounting plates 16 each have a base 22 configured for attachment to the clamp carrier 21 of a tire changer. When the clamp 10 is assembled, the base portions 22 of the mounting plates 16 extend below the lower edges of the gripping plates 20 and the other support plates 12 and 18. Accordingly, the base portions 22 comprise define parallel channel means 24 having interiorly disposed rail means 26 that slidably engage oppositely disposed channels 28 formed on the clamp carrier 21, which is mounted on the table TT of the tire changer as shown in FIGS. 4 and 5. The base 22 includes at least one bore 23 formed therein that is configured to receive a locking pin or button 25 for releasably securing the claw 10 to the clamp carrier 21.

In the preferred embodiment, the shape of end plates 12, intermediate plate 18 and the upper portion of mounting plates 16 are substantially the same as that of the gripping plates 20; however, the surface area of support plates 12, 16 and 18 is smaller. Thus, the edges of the gripping plates 20 extend peripherally beyond the edges of the support plates 12, 16 and 18 to prevent the support plates 12, 16 and 18 from directly engaging the wheel rim and potentially damaging the rim when the rim is compressed against the gripping plates 20.

With reference to FIG. 3, each of the support plates 12, 16 and 18 and the gripping plates 20 include at least one bore

29 formed therein which may be aligned when the clamp 10 is assembled to receive pin means 30 and fasteners 32 to secure the support plates 12, 16 and 18 and the gripping plates 20 together. Alternatively, any other suitable means of attachment is contemplated to be within the scope of the present invention. The clamp 10 is notched to form surfaces 34 and 36 for gripping the rim of the wheel. Notch 34 forms a claw for gripping the outer periphery of the rim. Accordingly, the rim is seated in notch 34 when the rim is gripped from the outside. The inner periphery of the rim is seated against surface 36 when the rim is gripped from the inside.

With reference to FIG. 4, four clamps 10 are used with the conventional rim holding tire changer. The clamps 10 are attached to the clamp carrier 21, which is, in turn, attached to the table top TT. The clamps 10 may be adjusted to secure the outside or inside of rim by moving the clamp carriers 21 toward or away from the center of the table TT as required.

Thus, although there have been described particular embodiments of the present invention of a new and useful Laminated Clamp For A Rim Holding Tire Changer, it is not intended that such references be construed as limitations upon the scope of this invention except as set forth in the following claims.

What is claimed is:

1. A clamp for use in connection with a rim holding tire changer, said clamp comprising:

at least one gripping plate disposed between a plurality of support plates;

said at least one gripping plate being configured to allow a portion of said at least one gripping plate to operably engage the rim of a wheel to secure the wheel in a fixed position; and wherein the portion of said gripping plate that operably engages the rim of a wheel is made of an elastomeric material and the support plates are made of a relatively rigid material.

2. The clamp of claim 1, wherein:

the gripping plates are configured to prevent the support plates from contacting the rim when the rim is seated in the clamp.

3. The apparatus of claim 1, wherein:

there are a plurality of gripping plates.

4. The apparatus of claim 3, wherein the elastomeric material is a plastic material.

5. The apparatus of claim 3, wherein the elastomeric material is a rubber material.

6. The apparatus of claim 1, wherein:

the support plates are constructed from metal.

7. The apparatus of claim 1, wherein:

at least one of the support plates includes a base configured for attachment to the tire changer.

8. The apparatus of claim 1, wherein:

said at least one gripping plate includes a first edge configured to grip an outside surface of the wheel rim.

9. The apparatus of claim 8, wherein:

the first edge includes a notch for receiving the outside surface of the wheel rim.

10. The apparatus of claim 1, wherein:

said at least one gripping plate includes a second edge configured to grip an inside surface of the wheel rim.

11. The apparatus of claim 10, wherein:

the second edge includes a surface configured to receive the inside surface of the wheel rim.

12. The apparatus of claim 1, wherein:

a peripheral edge of said at least one gripping plate extends peripherally beyond a peripheral edge of each of the adjacent support plates such that the rim seats against the gripping plate when the clamp is operably installed on a rim holding tire changer.

13. The apparatus of claim 1, wherein:

said clamp includes at least four gripping plates;

the plurality of support plates includes a pair of mounting plates, each having a base configured for attachment to the tire changer, an intermediate plate, and a pair of end plates.

14. The apparatus of claim 13, wherein the plates are arranged consecutively adjacent one another as follows:

an end plate, a gripping plate, a mounting plate, a gripping plate, the intermediate plate, a gripping plate, a mounting plate, a gripping plate, and an end plate.

15. A clamp for gripping the rim of a wheel on a rim holding tire changer, comprising:

at least four gripping plates constructed for engagement with a wheel and alternately interposed between a plurality of relative by rigid support plates in a layered fashion;

wherein each of the gripping plates includes an elastomeric edge having a notch configured to grip an outside surface of the wheel rim and a surface configured to grip an inside surface of the wheel rim, and wherein the edge extends peripherally beyond adjacent support plates to prevent the rim from contacting the support plates when the rim is seated in the clamp; and wherein the plurality of support plates includes first and second mounting plates each having a base configured for attachment to the tire changer, first and second end plates, and an intermediate plate.

16. The clamp of claim 15, wherein:

the gripping plates are constructed of a pliable material.

17. The clamp of claim 15, wherein:

the support plates are constructed of a rigid material.

18. A method of gripping the rim of a wheel on a tire changer, comprising:

a) providing at least one gripping unit, each gripping unit including:

at least one gripping plate disposed between a plurality of relatively rigid support plates, said at least one gripping plate having at least one elastomeric edge configured to grip the rim of a wheel; and b) causing the at least one gripping plate to engage the rim of the wheel so that the gripping edge is held firmly against the rim and the support plates are prevented from contacting the rim.

* * * * *